United States Patent
Qiao et al.

(10) Patent No.: US 10,456,817 B1
(45) Date of Patent: Oct. 29, 2019

(54) ENVIRONMENT-FRIENDLY AND IN SITU IMMOBILIZED METHOD OF RENOVATING HEAVY METAL CONTAMINATED SOIL WITH HUMIC ACID SUBSTANCE

(71) Applicant: China University of Petroleum (East China), Qingdao (CN)

(72) Inventors: Yingyun Qiao, Qingdao (CN); Yuanyu Tian, Qingdao (CN); Kechang Xie, Qingdao (CN); Zhaohe Yang, Qingdao (CN); Xue Ming, Qingdao (CN); Zhimei Zhang, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/293,088

(22) Filed: Mar. 5, 2019

(30) Foreign Application Priority Data

Dec. 10, 2018 (CN) .......................... 2018 1 1501221

(51) Int. Cl.
*B09C 1/00* (2006.01)
*B09C 1/08* (2006.01)
*B09C 1/10* (2006.01)

(52) U.S. Cl.
CPC . *B09C 1/08* (2013.01); *B09C 1/10* (2013.01)

(58) Field of Classification Search
CPC .................................... B09C 1/10; B09C 1/00
See application file for complete search history.

(56) References Cited

U.S. PATENT DOCUMENTS

| | | | | |
|---|---|---|---|---|
| 6,802,805 B2 * | 10/2004 | Akae | .................. | B09C 1/08 405/128.1 |
| 9,427,785 B2 * | 8/2016 | Riddle | .................. | G01N 33/24 |
| 10,259,025 B2 * | 4/2019 | Li | .................. | B09C 1/08 |

* cited by examiner

*Primary Examiner* — Janine M Kreck
(74) *Attorney, Agent, or Firm* — Volpe and Koenig, P.C.

(57) ABSTRACT

Providing a environment-friendly and in situ immobilized method of renovating heavy metal contaminated soil with humic acid substance, comprising: while the heavy metal contaminated soil being pulverized, adding humic acid substance into the soil according to weight ratio 5-20:1 of the humic acid substance to the total heavy metals contained in the soil, then aging the soil for more than 24 hours after the pulverization process; 2) adding 1-3 parts by weight of semi-coke bacterial fertilizer to 100 parts by weight of the water-stable granular structures, and mixing uniformly. The provided method for renovating heavy metal contaminated soil is reasonable with simple and safe operation and a low production cost, the method can be used for performing in-situ reduction, complexation and solidification, permanently encapsulating and blocking the heavy metals, eradicating secondary pollution and rebound of the treated pollutants, improving the natural environment with rapid renovation and desirable effect, the restored soil can normally grow trees and flowers and plant a variety of crops, the treatment cost is low, and the method may be applied in a wide range and produce improved economic and social benefits, thereby fulfill the predetermined purpose desirably.

10 Claims, No Drawings

ENVIRONMENT-FRIENDLY AND IN SITU IMMOBILIZED METHOD OF RENOVATING HEAVY METAL CONTAMINATED SOIL WITH HUMIC ACID SUBSTANCE

CROSS REFERENCE TO RELATED APPLICATIONS

This application claims priority to Chinese Application No. 201811501221.1, filed on Dec. 10, 2018, entitled "Environment-Friendly and In Situ Immobilized Method of Renovating Heavy Metal Contaminated Soil with Humic Acid Substance", which is specifically and entirely incorporated by reference.

FIELD OF THE INVENTION

The invention relates to the purification and treatment of heavy metal contaminated soil, especially relates to the renovation of chromium contaminated soil, and particularly relates to a environment-friendly and in situ immobilized method of renovating heavy metal contaminated soil with humic acid substance.

BACKGROUND OF THE INVENTION

Soil pollution poses a serious threat to the ecological environment, food safety and human health. The soil pollution caused by heavy metal pollutants has been particularly prominent in recent years, and the pollution of soil contaminated with chromium is especially outstanding.

China has nearly 70 major chromium slag contaminated sites, together with a large number of enterprises engaging with electroplating, leather processing and other business, it causes serious chromium pollution of soil, threatens or endangers groundwater and drinking water sources. In addition, municipal solid wastes (sludge, fly ash, garbage) and phosphate fertilizers contain chromium. Due to the agricultural reuse of these solid wastes having certain fertility, the chromium content in the soil is higher than the environmental background value and becomes one of the sources of chromium pollution.

The treatment and renovation technology of chromium-contaminated sites is the focus and difficult problem of environmental protection and technology research at home and abroad. Chromium exists in the nature world mainly with two stable valence states, namely hexavalent chromium (VI) and trivalent chromium (III). Trivalent chromium is mainly presented in the ionic form of $Cr^{3+}$, which has low activity and toxicity; while the hexavalent chromium is mainly presented in the ionic forms of $HCrO^{4-}$ and $CrO4^{2-}$, both are easily soluble in water and have high activity and strong toxicity.

The current renovation technologies of chrome-contaminated soil may be classified into two types, the first type of renovation technology focuses on modifying the existence form of chromium in the soil, reducing hexavalent chromium to be trivalent chromium, bringing down its migration ability and bioavailability of hexavalent chromium in the environment, thereby reducing the hazard of the chromium pollutants; the second type of renovation technology intends to completely remove chromium from the chrome-contaminated soil. At present, the remediation technology for chrome-contaminated soil mainly comprises bioremediation method, physical restoration method, physical and chemical restoration method, and chemical renovation method.

The bioremediation method includes phytoremediation and microbial remediation. The microbial remediation uses indigenous microorganisms in the original soil or supplements the domesticated and efficient microorganisms to the polluted environment. The hexavalent chromium is reduced into the trivalent chromium by a biological reduction reaction under the optimized operating conditions, thereby renovate the contaminated soil. The bioremediation method has the advantages of desirable renovation effect, low cost and small secondary pollution, but the renovation cycle is very long.

The physical restoration method uses relatively classic measures for controlling chromium pollution in soil, the method mainly includes measures such as earth removed from some other place to improve the local soil, soil replacement and deep tillage for turning the soil. By means of mixing the polluted soil with removed earth, replaced soil and the soil turned by deep tillage, the content of chromium in the polluted soil may be reduced, thereby bring down the toxicity of chromium to soil and plant systems. The physical restoration method has the advantages that the method is simple, the spent time is short, and the renovation is complete and stable, but its implementation has many disadvantages, such as it requires a large amount of earthwork, the investment and cost is high, the contaminated soil still exists; in addition, it destroys the soil structure, causes a decline of the soil fertility, and the transferred soil shall be stacked or processed. However, the removed soil or soil replacement is still a practical and effective method for treating a small area of seriously polluted soil.

Physical and chemical restoration method includes the processes of electrokinetic remediation, electrothermal restoration and soil leaching. The electrokinetic remediation relates to inserting the cathode and the anode into the soil, applying the electrodes with direct current, and moving $Cr^{6+}$ to the cathode under the action of the electric field, then carrying out centralized treatment. Electrothermal restoration uses high-frequency voltage to generate magnetic waves, which heats the soil and separates the chromium from the soil to fulfill the purpose of restoration. The soil leaching uses an eluent to transfer chromium from the soil solid phase to the soil liquid phase, and performs further treatment on the chromium-containing water. Although the physical and chemical restoration method has many advantages, it suffers from insurmountable shortcomings such as the energy consumption is relatively high, the renovated soil area is limited, and it may easily cause secondary pollution.

The chemical renovation method includes adding a modifier into the soil for adsorption, oxidation, reduction or precipitation, which alters the form of chromium existing in the soil and reduces the bioavailability of chromium. Such a method has the advantages of high chemical reaction speed, short renovation time (e.g., several weeks to several months); high reaction intensity, and low sensitivity to property and concentration of contaminant; and being effective for certain organic substances which can hardly be treated by other methods, thus the method is the most promising technology for treating chromium contaminated soil with practical potential. However, given that the reaction with a reducing agent requires certain conditions, it will frequently produce secondary pollution or destroy the soil structure. For example, the ferrous sulfate reduction method requires an acidic environment of pH 3-4 in order to react with the hexavalent chromium. The common practice in the present relates to adjusting the pH value of the dilute sulfuric acid before the reaction, then using the lime to adjust the pH value to be neutral after the reaction, an introduction of the secondary pollution is inevitable in the process; moreover, the soil granular structure is destroyed, and the plants cannot be grown on the soil after the restoration process. There is not a practical and effective reduction modifier at present.

SUMMARY OF THE INVENTION

The purpose of the invention is to overcome the deficiencies in the prior art for renovating the heavy metal contaminated soil, and to provide a process of environment-friendly and in situ immobilized method of renovating heavy metal contaminated soil with humic acid substance; the invention relates to adding humic acid substances during the process of pulverizing heavy metal contaminated soil, so as to reduce the amount of humic acid substance, achieve the effect of uniformly mixing and strengthening in-situ reduction, and avoid the hidden danger of sudden leachate pollution; in addition, the invention uses humic acid substance to form soil water-stable granular structures, thereby encapsulating and blocking the exudation and migration of heavy metals in the soil particles, ensures that the treated soil meets the environmental protection standards and shortens the time periods of reducing reaction and aging, eradicating the hidden danger of sudden leachate pollution; moreover, the invention utilizes semi-coke bacterial fertilizer to continuously produce the humic acid substance to ensure that water-stable granular structures are not destroyed, in order to achieve permanent reduction and immobilization, restore the function of self-renovation, planting and afforestation, thereby perform the permanent, sustainable, environment-friendly and in-situ soil renovation in the safe and low-cost manner.

Humic acid substance is a kind of macromolecular and organic mixture with weak acidity formed with remains of plants and animals following the decomposition and transformation of microorganisms and a series of geophysical and chemical processes, it maintains the natural state and biological activity of various structural components and its rich functional groups, such as aromatic rings, conjugated double bonds, hydroxyl groups, carboxyl groups, phenolic hydroxyl groups, carbonyl groups and the like. The inventors of the present invention found that by using humic acid in renovating chromium-contaminated soil, the humic acid can efficiently adsorb and reduce heavy metals, especially hexavalent chromium, in contaminated soil without adjusting the reaction environment, and form a complex of the trivalent chromium, thereby block the oxidation reaction and prevent secondary oxidation of the trivalent chromium. In addition, the humic acid substances can promote the formation of soil granular structure, perform the blocking function of encapsulating the chromium-containing soil and the function of modifying soil, thereby ensuring that the renovated soil restores self-healing, planting and afforestation functions. However, when the heavy metal contaminated soil is renovated, the used amount of humic acid is large and the cost is high; many dusts are generated during the pulverization process, and it is difficult to uniformly mix the humic acid with the soil, it requires an excessively long time to allow the treated soil to comply with the environmental protection standards, and there is a hidden danger of secondary pollution in the process, for example, during the soil remediation process, a sudden raining may cause that the content of hexavalent chromium in the leachate exceeds the environmental protection standards. Besides chromium, the process of renovating the soil containing other harmful heavy metals, such as cadmium, lead and copper face with the same problem and bottleneck. The inventors of the present invention have unexpectedly discovered that the adding of humic acid substances during the process of pulverizing soil to be renovated may effectively solve the aforementioned problems.

Therefore, the invention provides an environment-friendly and in situ immobilized method of renovating heavy metal contaminated soil with humic acid substance, comprising:

1) while the heavy metal contaminated soil being pulverized, adding humic acid substance into the soil according to weight ratio 5-20:1 of the humic acid substance to the total heavy metals contained in the soil, to allow in-situ reduction and solidification of the heavy metals, in this way, the mixing and contact reaction of heavy metals with humic acid substances may be strengthened while the heavy metal contaminated soil is pulverized, thereby increase the utilization rate of humic acid substances and the reduction rate of oxidable heavy metal ions (e.g., hexavalent chromium ion), then aging the soil for more than 24 hours after the pulverization process to allow humic acid substance promoting soil agglomeration so as to encapsulate and block the exudation and migration of heavy metals in soil particles, thereby forming soil water-stable granular structures with humic acid substance;

2) adding 1-3 parts by weight of semi-coke bacterial fertilizer to 100 parts by weight of the water-stable granular structures, and mixing uniformly to continuously produce active humic acid substances, so as to ensure that the water-stable aggregate are not destroyed, thereby restore the self-renovation, planting and afforestation functions, and achieve the continuous reduction and immobilization of heavy metals.

Preferably, the humic acid substance is one or more of humic acid, potassium humate, sodium humate and biomass pyrolysis oil. wherein the biomass pyrolysis oil is a rapid pyrolysis liquid product or bio-oil produced by the gasification process of agricultural and forest residues. For example, the agricultural and forest residues may be stalk, such as corn stalk.

Preferably, pulverizing the heavy metal contaminated soil in a pulverizer, selecting one of ball mill, cone crusher, toothed roller crusher, baffle crusher, impact crusher, hammer crusher, rotary crusher, and composite crusher, hydraulic crusher, deep cavity crusher, roll crusher, Simmons cone crusher, hydraulic cone crusher and jaw crusher.

Preferably, the semi-coke bacterial fertilizer is obtained by preparing the humectant corresponding to 0.1-2 wt. % of the biological semi-coke powder into an aqueous solution, mixing the aqueous solution of humectants with the biological semi-coke powder uniformly, so as to produce the modified biological semi-coke powder, then evenly loading the microbial bacterial fertilizer corresponding to 3-20 wt. % of the biological semi-coke powder on the modified biological semi-coke powder, and drying the mixture;

wherein the humectant is an anionic surfactant, a nonionic surfactant, and a silanol nonionic surfactant, and a solvent which has a small surface tension and is miscible with water; the solvent which has a small surface tension and is miscible with water includes one or more selected from the group consisting of ethanol, propylene glycol, glycerin and dimethyl sulfoxide;

wherein the microbial fertilizer comprises microbial thallus or microbial metabolites, the microbial thallus is at least one of *Bacillus, Saccharomyces cerevisiae, Aspergillus oryzae, Rhizobium*, Azotobacteria and Phosphorus bacteria; the metabolite is an active enzyme, which is one or more of a protease and a plant kinase.

Preferably, the loading method comprising: mixing microbial bacterial fertilizer solution and the modified biological semi-coke powder uniformly, to allow the microbial bacterial fertilizer loading on the modified biological semi-coke powder.

Preferably, obtaining the biological semi-coke powder by rapidly pyrolyzing agricultural and forest residues to prepare biological semi-coke, then pulverizing the biological semi-coke into the biological semi-coke powder which has a particle diameter of 0.01-5 mm.

Wherein a method for rapidly pyrolyzing comprising: pyrolyzing the agricultural and forest residues in reaction conditions of absence of air at 490-600° C. for 0.1-20 s.

Preferably, the method further comprising spraying humic acid substance into uniformly mixed materials obtained in the step 2).

Preferably, the added amount of humic acid substance is 8-10 times weight of the total heavy metals contained in the soil.

The methods are implemented and tested according to the above scheme, it is demonstrated that the method for renovating heavy metal contaminated soil provided by the invention is reasonable with simple and safe operation and a low production cost, the method can be used for performing in-situ reduction, complexation and immobilization, and permanently encapsulating and blocking the heavy metals, and eradicating secondary pollution and rebound of the treated pollutants, improving the natural environment with rapid renovation and desirable effect, the restored soil can normally grow trees and flowers and plant a variety of crops, the treatment cost is low, and the method may be applied in a wide range and produce improved economic and social benefits, thereby fulfill the predetermined purpose desirably.

DETAILED DESCRIPTION OF THE EMBODIMENTS

The features of invention will be described in detail with reference to the examples.

In the following examples and comparative examples:

The semi-coke bacterial fertilizer is obtained by preparing the silanol nonionic surfactant GSK-588 corresponding to 0.5 wt. % of the biological semi-coke powder into the 2 wt. % aqueous solution, mixing the aqueous solution with the biological semi-coke powder uniformly so as to prepare a modified biological semi-coke powder, then the microbial bacterial fertilizer is uniformly loaded on the modified biological semi-coke powder, and performing a low-temperature drying under a temperature less than 45° C.; wherein the microbial bacterial fertilizer is a microbial bacterial fertilizer solution containing *Bacillus, Rhizobium*, Azotobacteria and Phosphorus bacteria corresponding to 10 wt. % of the biological semi-coke powder.

The biomass pyrolysis oil and biological semi-coke are obtained by pyrolysis reaction of corn stalk in a condition of absence of air and a temperature of 550° C. for 10 seconds, wherein the biological semi-coke is pulverized into the powder having a particle size of 0.01-5 mm to prepare the biological semi-coke powder, which is used for preparing the semi-coke bacterial fertilizer.

The measuring method for the total chromium is potassium permanganate oxidation-diphenylcarbazide spectrophotometry, and the measuring method for hexavalent chromium is diphenylcarbazide spectrophotometry.

Example 1

In the first step, while the chromium contaminated soil is poured into the cone crusher, adding sodium humate solution having a concentration of 50 wt. % based on the weight ratio 10:1 of the sodium humate to chromium (total chromium) so as to perform pre-reduction, the process strengthens mixing of the chromium contaminated soil with the sodium humate while pulverizing the chromium-contaminated soil; the pulverized soil has a particle diameter less than 3 mm, given that the hexavalent chromium on the fresh interface generated by pulverization process is sufficiently contact with the sodium humate, it can strengthen the in-situ reduction reaction, and increase the utilization rate of humic acid substances and the reduction rate (>96%) of hexavalent chromium. After aging for 24 hours, the sodium humate promotes the soil agglomeration to encapsulate and block the leaching and migration of hexavalent chromium in the particles.

In the second step, with respect to 100 parts by weight of the reduced chromium-contaminated soil obtained in step (1), 2 parts by weight of the semi-coke bacterial fertilizer is added and uniformly mixed with the reduced chromium-contaminated soil.

Such a process eliminates the dust, reduces the reagent/soil ratio, and decreases the stacking amount and aging time of the pulverized chrome-contaminated soil, realizes the permanent reduction and solidification of heavy metal, restores the soil planting function, thereby perform the permanent, sustainable, environment-friendly and in-situ soil renovation in the safe and low-cost manner.

At the start of conducting the experiment, the total chromium content in the soil is 3,600 mg/kg, the hexavalent chromium content is 1,680 mg/kg, and the pH is 10.2. When the environment-friendly and in situ immobilized method of renovating heavy metal contaminated soil with humic acid substance in the invention is used, the pre-reduction is performed with the sodium humate according to the ratio 10:1 of the sodium humate to the chromium, then laying the pre-reduction soil aside for 24 hours, then the pre-reduction soil is sampled and measured. In the leachate prepared according to the solid waste leaching toxicity leaching method—sulfuric acid and nitric acid method (HJ/T 299-2007), the total chromium content is 15.0 mg/L, the hexavalent chromium content is 1.6 mg/L, the pH is 6.2. In the second step, the semi-coke bacterial fertilizer is added and mixed evenly. After laying aside for 30 days, the leachate is sampled and measured again. The total chromium content and hexavalent chromium content in the leachate are less than the lower test and detection limit (0.04 mg/L). The flowers and corn cultivated on the renovated soil can grow normally.

Example 2

In the first step, while the chromium contaminated soil is poured into the cone crusher, adding the biomass pyrolysis oil based on the weight ratio 10:1 of the biomass pyrolysis oil and chromium (total chromium) so as to perform pre-reduction, the process strengthens mixing of the chromium contaminated soil with the biomass pyrolysis oil while pulverizing the chromium-contaminated soil; given that the hexavalent chromium on the fresh interface generated by pulverization process is sufficiently contact with the biomass pyrolysis oil, it can strengthen the in-situ reduction reaction, and increase the utilization rate of biomass pyrolysis oil and the reduction rate (>96%) of hexavalent chromium. The pulverized soil has a particle size less than 3 mm, after aging for 24 hours, the biomass pyrolysis oil promotes the soil agglomeration to encapsulate and block the leaching and migration of hexavalent chromium in the particles.

In the second step, with respect to 100 parts by weight of the reduced chromium-contaminated soil obtained in step (1), 2 parts by weight of the semi-coke bacterial fertilizer is added and uniformly mixed with the reduced chromium-contaminated soil, and then the biomass pyrolysis oil is sprayed into the chromium-contaminated soil.

Such a process eliminates the dust, reduces the reagent/soil ratio, and decreases the stacking amount and aging time of the pulverized chrome-contaminated soil, realizes the permanent reduction and solidification, restores the soil planting function, thereby perform the permanent, sustainable, environment-friendly and in-situ soil renovation in the safe and low-cost manner.

At the start of conducting the experiment, the total chromium content in the soil is 3,600 mg/kg, the hexavalent chromium content is 1,680 mg/kg, and the pH is 10.2. When the environment-friendly and in situ immobilized method of renovating heavy metal contaminated soil with humic acid substance in the invention is used, the pre-reduction is performed with the biomass pyrolysis oil according to the ratio 10:1 of the biomass pyrolysis oil to the chromium, then laying the pre-reduction soil aside for 24 hours, then the pre-reduction soil is sampled and measured. In the leachate prepared according to the solid waste leaching toxicity leaching method—sulfuric acid and nitric acid method (HJ/T 299-2007), the total chromium content is 13.5 mg/L, the hexavalent chromium content is 0.5 mg/L, the pH is 7.5. In the second step, the semi-coke bacterial fertilizer is added and mixed evenly, and then the biomass pyrolysis oil is sprayed. After laying aside for 30 days, the leachate is sampled and measured again. The total chromium content and hexavalent chromium content in the leachate are less than the lower test and detection limit (0.04 mg/L). The flowers and corn cultivated on the renovated soil can grow normally.

Example 3

Performing the environment-friendly and in situ immobilized method of renovating heavy metal contaminated soil with humic acid substance according to the method in Example 2, the difference resides in that the biomass pyrolysis oil is not sprayed into the chromium-contaminated soil in the second step.

At the start of conducting the experiment, the total chromium content in the soil is 3,600 mg/kg, the hexavalent chromium content is 1,680 mg/kg, and the pH is 10.2. When the environment-friendly and in situ immobilized method of renovating heavy metal contaminated soil with humic acid substance in the invention is used, the pre-reduction is performed with the biomass pyrolysis oil according to the ratio 10:1 of the biomass pyrolysis oil and the chromium, laying the pre-reduction aside for 24 hours, then the pre-reduction is sampled and measured. In the leachate prepared according to the solid waste leaching toxicity leaching method—sulfuric acid and nitric acid method (HJ/T 299-2007), the total chromium content is 18.0 mg/L, the hexavalent chromium content is 2.2 mg/L, the pH is 7.5. In the second step, the 2 wt. % of semi-coke bacterial fertilizer is added and mixed evenly, after laying aside for 30 days, the leachate is sampled and measured again. The total chromium content and hexavalent chromium content in the leachate are 0.1 mg/L and 0.06 mg/L, respectively. The flowers and corn cultivated on the renovated soil can grow normally.

Comparative Example 1

Performing the environment-friendly and in situ immobilized method of renovating heavy metal contaminated soil with humic acid substance according to the method in Example 2, the difference resides in that the semi-coke bacterial fertilizer is added in the first step along with the biomass pyrolysis oil, and the sprayed biomass pyrolysis oil is also added in the first step together with the semi-coke bacterial fertilizer.

At the start of conducting the experiment, the total chromium content in the soil is 3,600 mg/kg, the hexavalent chromium content is 1,680 mg/kg, and the pH is 10.2. After renovation, in the leachate prepared according to the solid waste leaching toxicity leaching method—sulfuric acid and nitric acid method (HJ/T 299-2007), the total chromium content is 1.3 mg/L, the hexavalent chromium content is 1.0 mg/L, the pH is 6.5.

Comparative Example 2

Performing the environment-friendly and in situ immobilized method of renovating heavy metal contaminated soil with humic acid substance according to the method in Example 2, the difference resides in that the weight ratio of the biomass pyrolysis oil and chromium (total chromium) is 2:1, and the added amount of semi-coke bacterial fertilizer is 5 wt. %.

At the start of conducting the experiment, the total chromium content in the soil is 3,600 mg/kg, the hexavalent chromium content is 1,680 mg/kg, and the pH is 10.2. When the environment-friendly and in situ immobilized method of renovating heavy metal contaminated soil with humic acid substance in the invention is used, the pre-reduction is performed with the sodium humate according to the ratio 2:1 of the biomass pyrolysis oil to the chromium, then laying the pre-reduction soil aside for 24 hours, then the pre-reduction soil is sampled and measured. In the leachate prepared according to the solid waste leaching toxicity leaching method—sulfuric acid and nitric acid method (HJ/T 299-2007), the total chromium content is 20.0 mg/L, the hexavalent chromium content is 2.5 mg/L. In the second step, the semi-coke bacterial fertilizer is added and mixed evenly, and then the biomass pyrolysis oil is sprayed, after laying aside for 30 days, the leachate is sampled and measured again. The total chromium content and hexavalent chromium content in the leachate are 1.2 mg/L and 0.08 mg/L, respectively. The plants, flowers and corn cultivated on the renovated soil can grow normally.

Example 4

In the first step, with respect to the chromium-contaminated farmland, the biomass pyrolysis oil is sprayed according to the weight ratio 10:1 of the biomass pyrolysis oil to chromium (total chromium), the chromium-contaminated farmland is crushed by a rotary tiller and mixed with the biomass pyrolysis oil, and the in-situ reduction reaction and fixed complexation are strengthened to increase the utilization rate of biomass pyrolysis oil and the reduction and immobilization rate (>96%) of the chromium ions. Such a process eliminates the dust and reduces the ratio of the reagent to the soil and the renovation cost by more than 70%.

In the second step, one day later, 50 kg per mu of semi-coke bacterial fertilizer is further sprayed on the surface of farmland, crushing and mixing uniformly by a rotary tiller, and the active humic acid is continuously produced to ensure that the water-stable granules in the farmland soil are not destroyed, and make sure that the measured cadmium content in the treated soil is in accordance with the environmental protection standards, so as to realizes the continuous reduction and solidification of heavy metal, restores the soil planting function, thereby perform the permanent, sustainable, environment-friendly and in-situ soil renovation in the safe and low-cost manner.

The invention claimed is:

1. A environment-friendly and in situ immobilized method of renovating heavy metal contaminated soil with humic acid substance, comprising:
   1) while the heavy metal contaminated soil is being pulverized, adding humic acid substance into the soil according to weight ratio 5-20:1 of the humic acid substance to the total heavy metals contained in the soil, to allow in-situ reduction and solidification of the heavy metals, then aging the soil for more than 24 hours after the pulverization process to allow humic acid substance promoting soil agglomeration so as to encapsulate and block the exudation and migration of heavy metals in soil particles, thereby forming soil water-stable granular structures with humic acid substance;
   2) adding 1-3 parts by weight of semi-coke bacterial fertilizer to 100 parts by weight of the water-stable granular structures, and mixing uniformly to continuously produce active humic acid substances, so as to ensure that the water-stable aggregate are not destroyed.

2. The method according to claim 1, wherein the heavy metal is hexavalent chromium ion.

3. The method according to claim 1, wherein the humic acid substance is one or more of humic acid, potassium humate, sodium humate and biomass pyrolysis oil.

4. The method according to claim 1, wherein the heavy metal contaminated soil is pulverized in a pulverizer selected from a ball mill, a cone crusher, a toothed roller crusher, a baffle crusher, an impact crusher, a hammer crusher, a rotary crusher, and a composite crusher, a hydraulic crusher, a deep cavity crusher, a roll a crusher, a Simmons cone crusher, a hydraulic cone crusher and a jaw crusher.

5. The method according to claim 1, wherein the preparation method of semi-coke bacterial fertilizer comprising: with respect to 100 parts by weight of biological semi-coke powder, uniformly mixing 0.1-2 wt. % of a humectant with the biological semi-coke powder to prepare modified biological semi-coke powder, then evenly loading 3-20 parts by weight of microbial bacterial fertilizer on the modified biological semi-coke powder, and drying;
   wherein the humectant is an anionic surfactant, a nonionic surfactant, and a silanol nonionic surfactant, and a solvent which has a small surface tension and is miscible with water; the solvent which has a small surface tension and is miscible with water includes one or more selected from the group consisting of ethanol, propylene glycol, glycerin and dimethyl sulfoxide;
   wherein the microbial bacterial fertilizer comprises microbial thallus or microbial metabolites, the microbial thallus is at least one of *Bacillus, Saccharomyces cerevisiae, Aspergillus oryzae, Rhizobium*, Azotobacteria and Phosphorus bacteria; the metabolite is an active enzyme, which is one or more of a protease and a plant kinase.

6. The method according to claim 5, wherein the loading method comprising: mixing microbial bacterial fertilizer solution and the modified biological semi-coke powder uniformly, to allow the microbial bacterial fertilizer loading on the modified biological semi-coke powder.

7. The method according to claim 5, wherein obtaining the biological semi-coke powder by rapidly pyrolyzing agricultural and forest residues to prepare biological semi-coke, then pulverizing the biological semi-coke into the biological semi-coke powder which has a particle diameter of 0.01-5 mm.

8. The method according to claim 7, wherein the rapidly pyrolyzing agricultural and forest residues comprises pyrolyzing the agricultural and forest residues in reaction conditions of absence of air at 490-600° C. for 0.1-20 s.

9. The method according to claim 1, wherein the method further comprising spraying humic acid substance into uniformly mixed materials obtained in the step 2).

10. The method according to claim 9, wherein the added amount of humic acid substance is 8-10 times weight of the total heavy metals contained in the soil.

* * * * *